US008819682B2

(12) United States Patent
Agarwal et al.

(10) Patent No.: US 8,819,682 B2
(45) Date of Patent: Aug. 26, 2014

(54) APPLICATION SWITCHING IN A SINGLE THREADED ARCHITECTURE FOR DEVICES

(75) Inventors: Nitin Kumar Agarwal, Bangalore (IN); Michael Cronin, Grunwald (DE); Nisha Patel, Bangalore (IN)

(73) Assignee: Agere Systems LLC, Allentown, PA (US)

( * ) Notice: Subject to any disclaimer, the term of this patent is extended or adjusted under 35 U.S.C. 154(b) by 818 days.

(21) Appl. No.: 12/522,738

(22) PCT Filed: Jan. 23, 2007

(86) PCT No.: PCT/US2007/001739
§ 371 (c)(1),
(2), (4) Date: Jul. 10, 2009

(87) PCT Pub. No.: WO2008/091248
PCT Pub. Date: Jul. 31, 2008

(65) Prior Publication Data

US 2010/0138834 A1 Jun. 3, 2010

(51) Int. Cl.
*G06F 9/46* (2006.01)
*G06F 9/48* (2006.01)
*H04M 1/725* (2006.01)

(52) U.S. Cl.
CPC ......... *G06F 9/4843* (2013.01); *H04M 1/72583* (2013.01)
USPC .......... 718/100

(58) Field of Classification Search
CPC .......... G06F 9/4843; G06F 9/4443
See application file for complete search history.

(56) References Cited

U.S. PATENT DOCUMENTS 5,608,395 A 3/1997 Kurtz et al.
5,974,438 A * 10/1999 Neufeld .......... 718/104

(Continued)

FOREIGN PATENT DOCUMENTS

EP 1 286 549 A2 2/2003
JP 2005284906 A 10/2005

OTHER PUBLICATIONS

Gray, Robert S., et al., "D'Agents: Applications and Performance of a Mobile-Agent System," Thayer School of Engineering / Department of Computer Science, Dartmouth College, Hanover, NH 03755, U.S.A., Received: Jan. 15, 2002; Revised: Jan. 15, 2002, [Retrieved on Sep. 13, 2007], Retrieved from the Internet: <URLcs.dartmouth.edu/-dfk/papers/gray:spe.pdf>.

(Continued)

*Primary Examiner* — Meng An
*Assistant Examiner* — James J Lee
(74) *Attorney, Agent, or Firm* — Mendelsohn, Drucker & Dunleavy, P.C.; Edward J. Meisarosh; Steve Mendelsohn

(57) ABSTRACT

A method and system for launching multiple applications simultaneously on a device under the control of application switching framework so that the operating system is only running one task for all the applications is provided. A single task is run under the control of an operating system. An application manager is run within the task. One or more applications are launched within the task under the control of the application manager. One of the applications is made the current application by switching, under user control, among the launched applications. A list of application descriptors is maintained for all the launched applications, and when switching, the application descriptor of one of the applications is used for displaying the application to a user on a screen. Each application descriptor contains forms of the launched applications. Each of the application descriptors contains a tree of forms with one root or parent form. A form represents an image to be displayed to the user. The image consists of text, pictures, bitmaps, or menus.

18 Claims, 9 Drawing Sheets

(56) References Cited

U.S. PATENT DOCUMENTS

| | | | | |
|---|---|---|---|---|
| 6,098,169 | A * | 8/2000 | Ranganathan | 712/227 |
| 6,401,155 | B1 * | 6/2002 | Saville et al. | 710/266 |
| 6,823,517 | B1 | 11/2004 | Kalman | 718/108 |
| 6,931,544 | B1 * | 8/2005 | Kienhofer et al. | 717/118 |
| 6,938,251 | B1 * | 8/2005 | Chow et al. | 718/100 |
| 6,957,071 | B1 | 10/2005 | Holur et al. | |
| 6,986,141 | B1 | 1/2006 | Diepstraten et al. | 718/108 |
| 7,123,945 | B2 | 10/2006 | Kokubo | 455/566 |
| 7,509,487 | B2 * | 3/2009 | Lu et al. | 713/151 |
| 7,581,192 | B2 * | 8/2009 | Stabb et al. | 715/781 |
| 7,761,853 | B2 * | 7/2010 | Hirata et al. | 717/127 |
| 7,836,446 | B2 | 11/2010 | Ode | |
| 2001/0032274 | A1 | 10/2001 | Asami et al. | 709/318 |
| 2002/0137543 | A1 * | 9/2002 | Murnaghan et al. | 455/557 |
| 2003/0115245 | A1 * | 6/2003 | Fujisawa | 709/107 |
| 2003/0229683 | A1 * | 12/2003 | Oshima et al. | 709/219 |
| 2005/0003850 | A1 * | 1/2005 | Tsuda et al. | 455/550.1 |
| 2005/0009510 | A1 | 1/2005 | Tsuda et al. | 455/418 |
| 2005/0054372 | A1 | 3/2005 | Tsuda et al. | 455/550.1 |
| 2005/0107073 | A1 * | 5/2005 | Cheiky et al. | 455/414.2 |
| 2005/0125802 | A1 * | 6/2005 | Wang et al. | 718/108 |
| 2005/0223352 | A1 * | 10/2005 | Nishida | 717/100 |
| 2006/0014574 | A1 * | 1/2006 | Linn | 455/574 |
| 2006/0031663 | A1 * | 2/2006 | Peller et al. | 712/245 |
| 2006/0047495 | A1 * | 3/2006 | Sanchez et al. | 703/22 |
| 2006/0129600 | A1 * | 6/2006 | Ode | 707/104.1 |
| 2006/0150194 | A1 * | 7/2006 | Xing et al. | 718/108 |
| 2006/0293088 | A1 * | 12/2006 | Kokubo | 455/566 |
| 2008/0120615 | A1 * | 5/2008 | Huang et al. | 718/100 |
| 2008/0139190 | A1 * | 6/2008 | Bunte et al. | 455/418 |
| 2008/0170703 | A1 * | 7/2008 | Zivney | 381/2 |
| 2009/0176528 | A1 * | 7/2009 | Moran et al. | 455/556.1 |

OTHER PUBLICATIONS

PCT International Search Report for PCT/US2007/01739 dated Feb. 19, 2008 (9 pages).

Morris, D., et al., "An Appraisal of the Atlas Supervisor," ACM Proceedings of the National Conference, Jan. 1, 1967, pp. 223-243.

Hoare, C. A. R., "Monitors: An Operating System Structuring Concept," Communications of the Association for Computing Machinery, Inc., New York, NY, vol. 17, No. 10, Oct. 1, 1974, pp. 549-557.

Drew, D.L., "The LACONIQ Monitor: Time Sharing for Online Dialogues," Communications of the Association for Computer Machinery, New York, NY, vol. 10, No. 12, Dec. 1, 1967, pp. 765-771.

Bobrow, D.G., et al., "TENEX, A Paged Time Sharing System for the PDP-10," Communications of the Association for Computing Machinery, New York, NY, vol. 15, No. 3, Mar. 1, 1972, pp. 135-143.

EclipseME, "J2ME Development using Eclipse—From Zero to Mobile in Minutes," Mar. 16, 2008, Retrieved from the Internet: <URL: eclipseme.org/docs/news.html> [Retrieved on Mar. 25, 2010.].

Marejka, Richard, "Learning Path: MIDLet Life Cycle," Sun Developer Network, Feb. 28, 2005, Retrieved from the Internet: <URL: developers.sun.com/mobility/learn/midp/lifecycle/> [Retrieved on Mar. 25, 2010.].

Davis, V., et al., "Generative Approaches for Application Tailoring of Mobile Devices," 43rd ACM Southeast Conference, Mar. 20, 2005, pp. 2-237-2-241, Kennesaw, GA. Retrieved from the Internet: <delivery.acm.org/10.1445/1170000/1167308/p237-davis.pdf> [Retrieved on Mar. 25, 2010.].

Supplementary European Search Report dated Mar. 25, 2010 in Application No. EP 07 74 9069 (07749069.6).

Examiner's Office Letter; Mailed Feb. 1, 2012 for the corresponding JP Application No. 2009-547206.

Examiner's Office Letter; Mailed Dec. 25, 2012 for the corresponding JP Application No. 2009-547206.

Notice of Preliminary Rejection; Mailed on Jul. 27, 2013 for corresponding KR Application No. 10-2009-7017496.

Examiner's Decision of Refusal; Mailed Nov. 26, 2013 for corresponding JP Application No. 2009-547206.

Notice of Preliminary Rejection; Mailed on Nov. 27, 2013 for corresponding KR Application No. 10-2009-7017496.

* cited by examiner

APPLICATION SWITCHING IN A SINGLE THREADED ARCHITECTURE FOR DEVICES

BACKGROUND OF THE INVENTION

The present invention relates to an application switching method for a portable device, and more particularly to an application switching apparatus for a portable device which is not capable of multitasking.

Technological advances in portable information devices, such as a portable telephone, PDAs, and the like, allow the devices to perform many functions such as gaming, digital photography, audio reproduction and communications such as internet connection and many other functions. Therefore, the portable devices have become multi-functional devices and have many uses.

Therefore, a user may want to use multiple applications at the same time. Previously, a multitasking operating system had been used to launch multiple applications at the same time where all the applications are managed as a separate task. Thus, when a user wanted to switch to a different application, it shall effectively be a task switch, to display the other application.

The problem with this approach was that there was a lot of overhead required, as each application is defined as a task. Application development and maintenance was cumbersome because it required in-depth knowledge of the processing environment so development costs increased. Also, runtime costs were greater because a more complicated operating system was required. This lead to a cumbersome user interface, longer booting and shutdown times of the devices due to lengthy operating system initialization and shutdown, and more battery power consumption. There were also higher manufacturing costs, managing more tasks in memory required more memory, a more complicated operating system like Symbian involves more licensing costs, and more MIPS (millions of instructions per second) required.

As such, there is a need for an framework for application switching that provides the user the ability to launch many applications simultaneously and allows multiple applications to launch in a single task that keeps running costs and development costs low but allows users to switch between multiple applications on a device.

BRIEF SUMMARY OF THE INVENTION

In accordance with an embodiment of the invention, multiple applications are launched on a device under the control of application switching framework so that the operating system is only running one task for all the applications. This single task is run under the control of an operating system. An application manager is run within this task. One or more applications are launched within this task under the control of the application manager. One of the applications is made the current application by switching, under user control, among the launched applications.

A list of application descriptors is maintained for all the launched applications. When switching, the application descriptor of one of the applications is used for displaying the application to a user on a screen. Each application descriptor contains forms of the launched applications. Each of the application descriptors contains a tree of forms with one root or parent form. A form represents an image to be displayed to the user. The image consists of text, pictures, bitmaps, or menus.

All the applications are initialized, but not launched, when the device is turned on. The applications may be closed, after being launched.

One of the applications may be displayed to a user on a screen. The user may be provided control over one of the applications.

These and other advantages of the invention will be apparent to those of ordinary skill in the art by reference to the following detailed description and the accompanying drawings.

DETAILED DESCRIPTION

Figure 1:
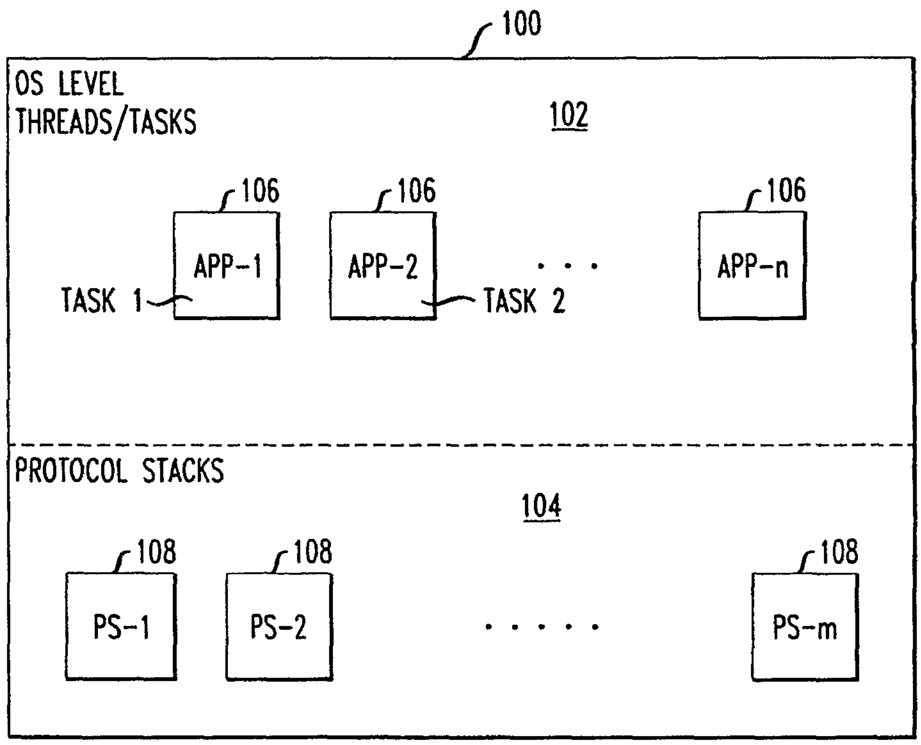
FIG. 1 is an example operating system level diagram of launching multiple applications simultaneously using traditional multitasking.

Referring now to FIG. 1 there is shown an operating system level diagram of launched multiple applications simultaneously using traditional multitasking. The operating system 100 is shown. The operating system 100 has an application layer 102 and protocol stacks layer 104. In the application layer 102, applications 106 are launched. All of the applications 106 are launched as a separate and independent task. Also, in the protocol stacks layer 104, protocol stacks 108 are managed separately as separate tasks. Each application 106 is launched separately and independently of each other application 106. The operating system sees and controls each of the applications 106 independently.

Figure 2:
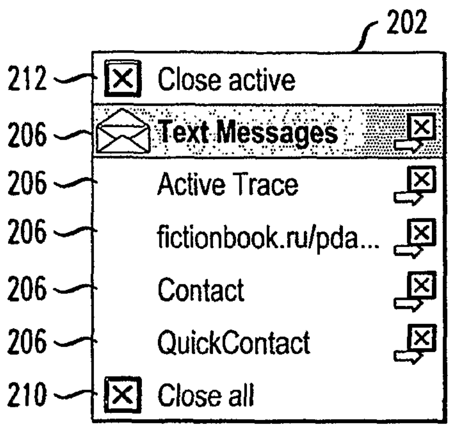
FIG. 2 illustrates an example user interface for an operating system that uses traditional multitasking.

Referring now to FIG. 2, there is shown a user interface for the operating system that uses traditional multitasking and application switching as shown in FIG. 1. The user interface 202, gives a user the choice to choose one of the applications 206 that are currently launched in the operating system 100. The user is also given the choice to close the active applications by choosing "close active" 212 (the application that is shown on the screen) or to close all of the applications by choosing "close all" 210.

Theretofore, if a user was to choose one of the applications 206 on the list of currently launched applications, the operating system can cause the chosen application to be displayed, and give the user control over the application without actually closing the previously used application.

Figure 3:
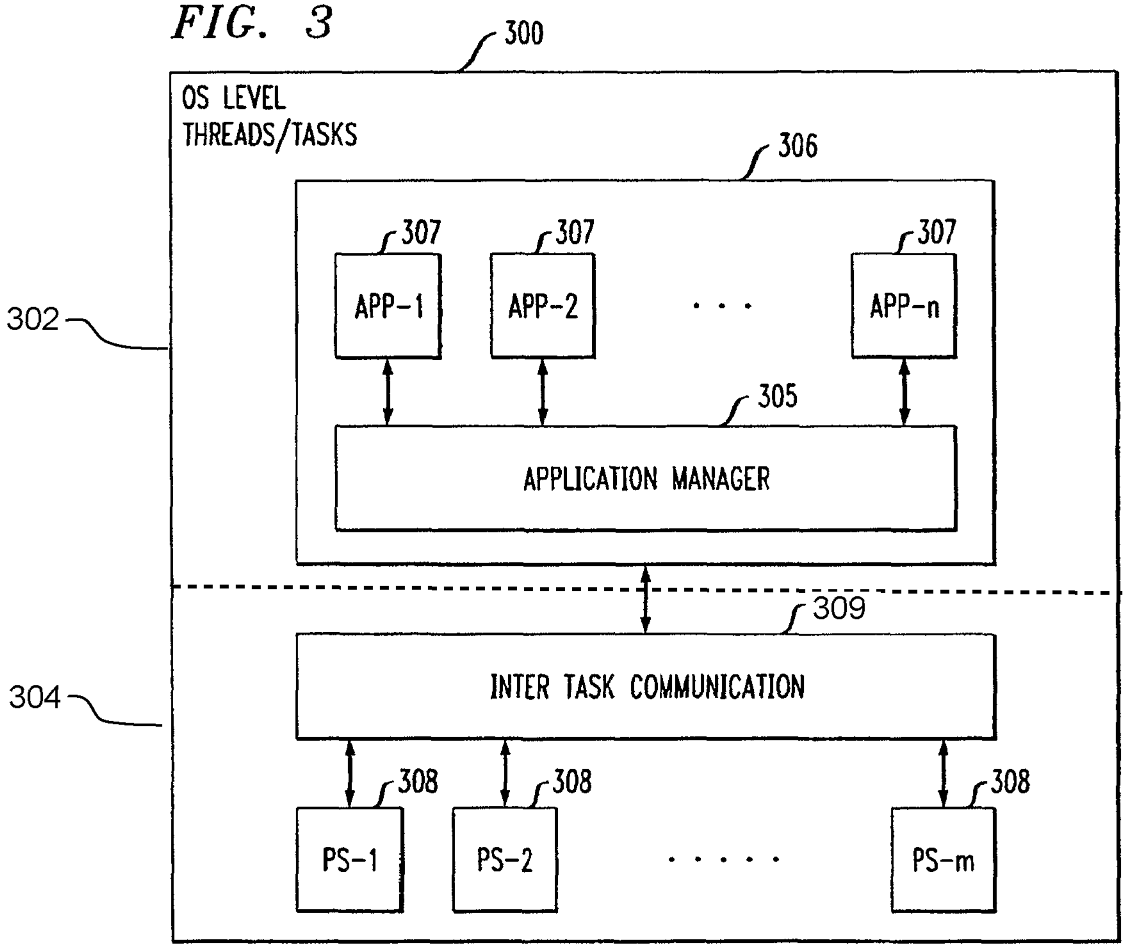
FIG. 3 is a diagram of application switching framework according to one embodiment of the present invention.

Referring now to FIG. 3 there is shown an operating system level diagram of launched multiple applications according to one embodiment of the invention. The operating system 300 is shown. The operating system 300 has an application layer 302 and a protocol stacks layer 304. There is an Application Switching Framework—Application Manager 305 in the application layer 302. A single task 306 is run in the application layer 302 of the operating system 300. Applications 307 are launched inside of the task 306 so that the operating system only sees and interacts with the task 306 and not the applications 307. Since all of the applications 307 are launched within task 306, and task 306 is under the control of the operating system, the applications 307 cannot be seen by the operating system and the operating system believes that it is running only one task, which is task 306. Therefore, the applications 307 may be said to be launched inside of or within the task 306.

The application manager 305 controls the applications 307. The applications 307 are all under the control of the application manager 305. The application manager 305 coordinates and maintains the applications 307. The application manager 305 also provides the support to launch the applications 307. Each application 307 must register itself with the application manager 305.

In the protocol stacks layer 304, protocol stacks 308 are managed as separate tasks. Protocol stack task are responsible for the communication part of a device. Many applications need a communication system (e.g. to make a phone call), which is served by these tasks. 309 is the inter task communication mechanism. This is used to provide a communication among the tasks. All the tasks are responsible to run in coherence to provides the device functionality to the user. This is the mechanism that facilitates communication with each other. The inter task communication mechanism 309 is connected to every task and is a logical module which is implemented as part of each task. Every task can send a message to any other task with control and data information. Each task may receive messages from any other task. When Task A wants to send a message to Task B, Task A drops a message (with control and data information) into the Task B's mail box. Task B reads the message from it's Mail Box when needed which may contain many other messages and also the message from Task A.

Figure 4:
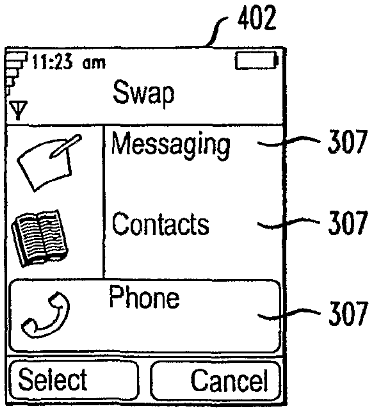
FIG. 4 illustrates a user interface for an operating system according to one embodiment of the invention.

Referring now to FIG. 4, there is shown is a user interface 402 for an application switcher of the present invention. Using the user interface 402, the user may choose between one of the applications 307 that are currently launched in the operating system 300. Therefore, if a user was to choose one of the applications 307 on the list of currently launched applications 307 in the user interface 402, the application switcher can switch to the chosen application 307 and thus can switch control of the user and the display away from one of the applications 307 without actually closing the previously used application 307. The application switcher uses the application manager 305 to switch between the applications 307.

Figure 5:
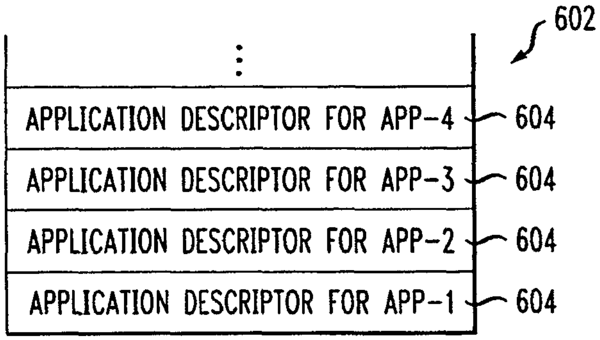
FIG. 5 is a diagram of a stack of application descriptors of launched applications according to one embodiment of the present invention.
Figure 6:
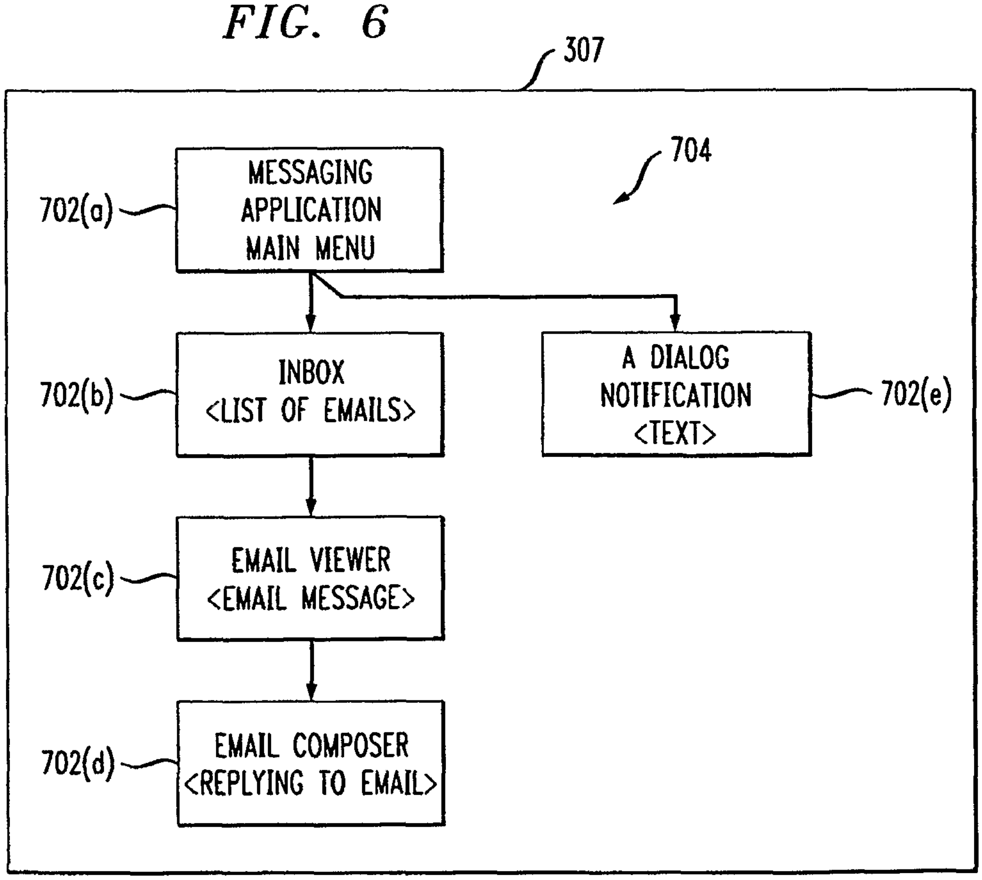
FIG. 6 is a diagram of a tree of forms of a application according to one embodiment of the present invention.

FIG. 5 is a diagram of a stack of application descriptors for launched applications according to one embodiment of the present invention. The application manager 305 keeps a stack 602 of application descriptors 604 for launched applications 307. The application descriptors 604 provide all of the required details of the applications 307 to the application manager 305. The application manager 305 manages the stack 602 of application descriptors 604 of all the launched multiple applications 307. This allows the user to launch multiple applications 307. The user can launch multiple applications 307 one by one. This way, all the launched applications 307 are put on top of one another in a list to form a stack as shown in FIG. 6. The top application descriptor 604 of the stack 602 is the application descriptor 604 for the current application 307. This is the application that is currently being displayed and that the user currently has control over.

The application manager 305 may move the application descriptors 604 in this stack 602 as requested by the user as described in reference to FIG. 9 below. Each application descriptor 604 provides the access to all the forms of the multiple applications 307. A form is an image displayed to the user on a screen, which consists of Text, Picture, Bitmaps and Menus etc. A form contains all of the information that an application 307 needs to convey to a user. A launched application 307 consists of multiple forms.

FIG. 6 is a diagram of an example tree of forms of a messaging application according to one embodiment of the present invention. When a user uses a program 307 such as a messaging program 307 as shown in FIG. 6, the forms 702 of the messaging program 307 are linked with each other and form a tree 704 as shown in FIG. 6. There are five forms 702 forming the tree 704 in the messaging application 307. Each form 702 knows which form comes before it and which form comes after it. For example, for the Email Viewer form 702(*c*), knows that after it comes the Email Composer form 702(*d*) for replying to an email that was just viewed and that before it is the Inbox form 702(*b*) for looking at a list of the email messages before viewing them. The application manager 305 knows which of the application descriptors 604 to use and each application descriptor 604 knows how to display its own forms 702 on a display. This allows the correct information to be shown on a display.

Therefore, each application is a tree of forms (or windows) with one root/parent form (or window), although the application descriptor may contain other information. To enable switching between applications, a list of application descriptors (or contexts) is maintained where each application descriptor (or context) contains the forms (or windows) of one open (or launched) application. At a given time, one application will be the current application and whenever user wants to switch to another application, the application manager will move the appropriate application descriptor (or context) to the top of the stack and display the forms (or windows) on a screen and thereby allow the user to control the application.

Figure 7:
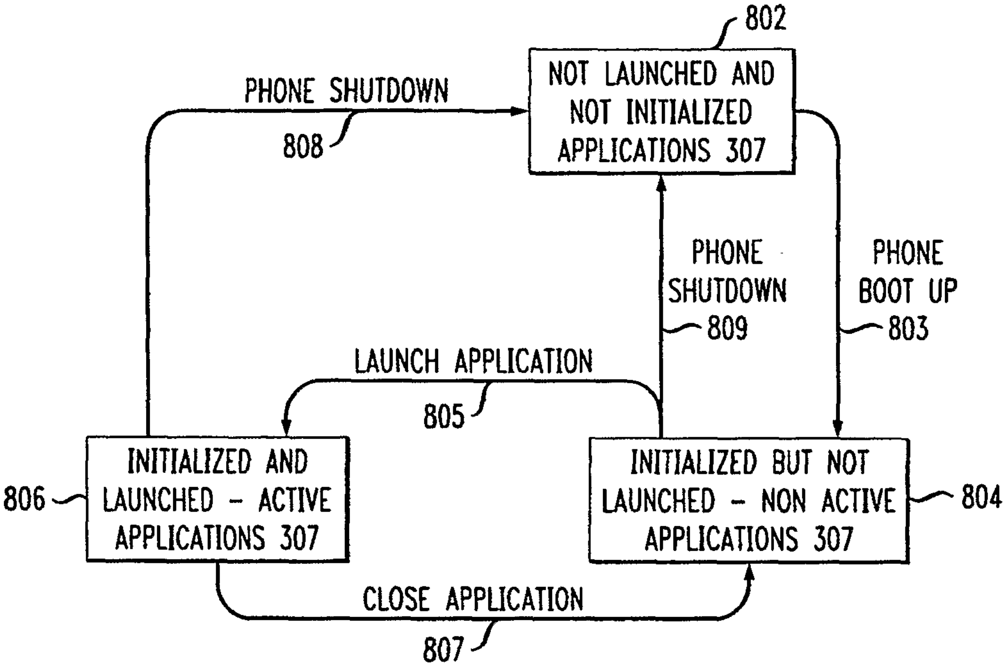
FIG. 7 is a diagram of the life cycle of the applications according to one embodiment of the present invention.

Referring now to FIG. 7, there is shown a diagram of the life cycle of the applications 307. The life cycle of the applications 307 begins in state 802. In this state, the device is turned off, and the applications 307 are not launched and not initialized. When the device is turned on, and booted up, as shown by arrow 803, all of the applications 307 are initialized and therefore their state changes to state 804. In state 804, the applications 307 are not active and cannot be used until they are launched. When a application 307 is launched (as described below with reference to FIG. 9), as shown by arrow 805, the state of the application 307 is changed to state 806, where it has now been launched, and can therefore be made the current application by a user (as described below with reference to FIG. 10). Since the applications 307 that have a state 806 are active, the user may switch between them without re-launching (as described below with reference to FIG. 10). If a application 307 is closed, as shown by arrow 807, the state of that application is changed back to state 804, where the application 307 is no longer active, and is initialized, but not launched, and therefore may not be used until it is re-launched. When the device is shut down as shown by arrows

808 and 809, the state of all the multiple applications 307 that have a state of 804 and are initialized but not launched or a state of 806 and are initialized and launched changed back to state 802 where they are not launched and not initialized.

Figure 8:
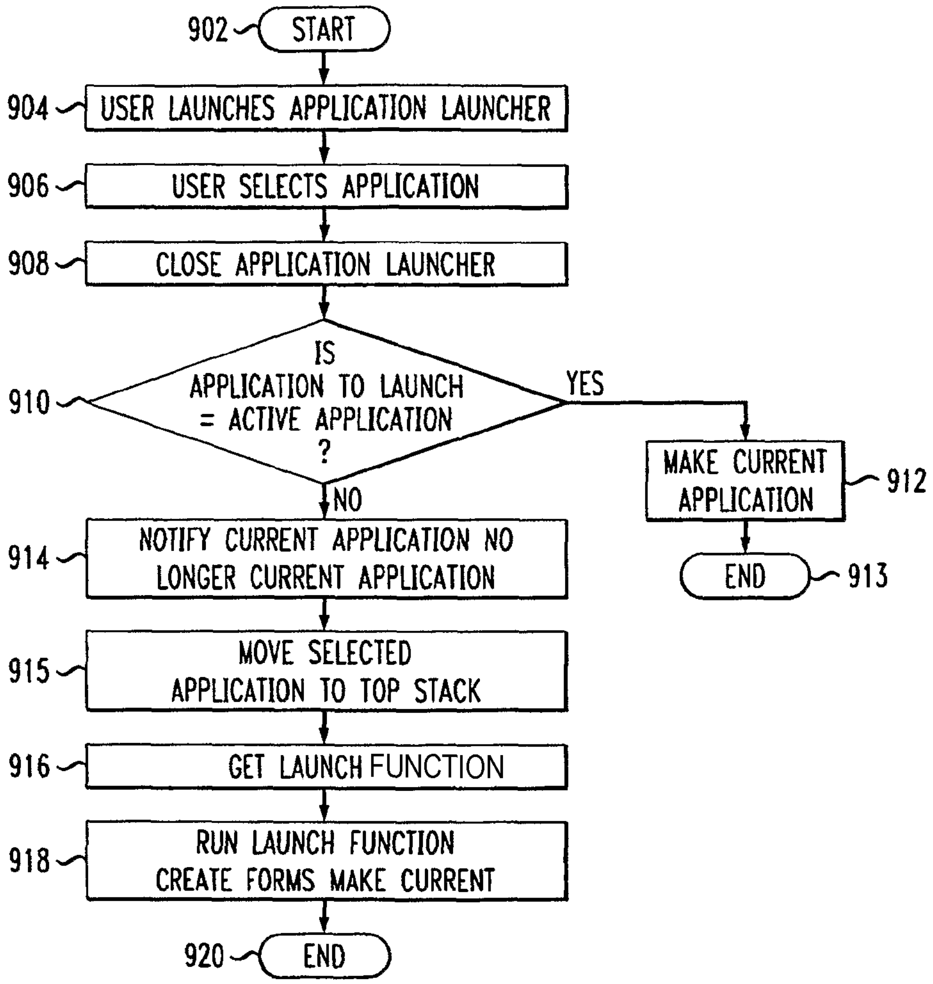
FIG. 8 is a flow chart is shown detailing the steps to launch applications to make them active.

Referring now to FIG. 8, a flowchart is shown detailing the steps to launch an application to make it active. The flowchart starts at step 902. In step 904, the user launches an application launcher. In step 906, the user selects an application to be launched from the applications 307. In step 908, the application launcher is closed by application manager. In step 910, it is determined whether the application that the user wants to launch is currently active. If the application that the user wants to launch is currently active, then the application that the user wants to launch is made the current application in step 912 and then the process ends in step 913.

If the application that the user wishes to launch is not currently active, then in step 914, the current application is notified that it is no longer the current application. Then, in step 915, the application descriptor of the selected application is moved to the top of the stack. Then, in step 916, the launch function of the application to launch is retrieved. In step 918, the launch function is run to create the forms to be displayed and make the launched application the current application. The process ends at step 920.

In this way, the user launches the applications 307 that the user thinks that they will need. Therefore, all of the launched applications may be switched between as described below with reference to FIG. 9.

Figure 9:
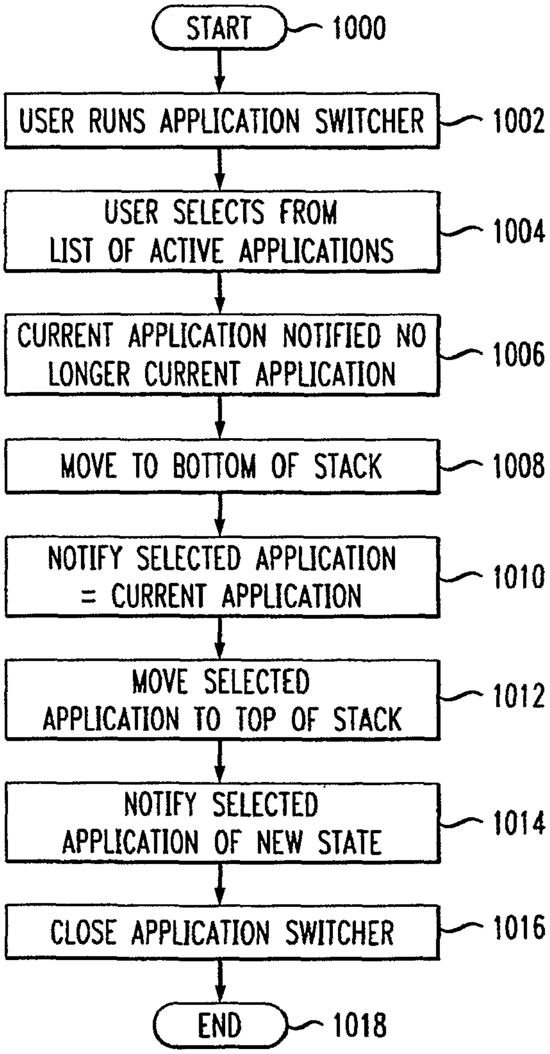
FIG. 9 is a flowchart detailing the steps to switch between applications that have already been launched to make one the current application.

Referring now to FIG. 9, a flowchart is shown detailing the steps to switch between applications that have already been launched to make one the current application. The process begins at step 1000. In step 1002, the user launches the application switcher. In step 1004, the user selects from a list of active applications the application that the user wishes to currently use. In step 1006, the current application is notified that it is no longer the current application. In step 1008, the former current application is moved to the bottom of the stack of application descriptors.

In step 1010, the selected application is made the new current application. In step 1012, the new current application is moved to the top of the application descriptors stack. In step 1014, the current application is notified of its new state. In step 1016, the application switcher is closed. The process ends in step 1018.

In this way, the user may switch between launched applications. If the user wishes to switch to a non-launched application, the user would have to launch the application as shown with reference to FIG. 8.

Figure 10:
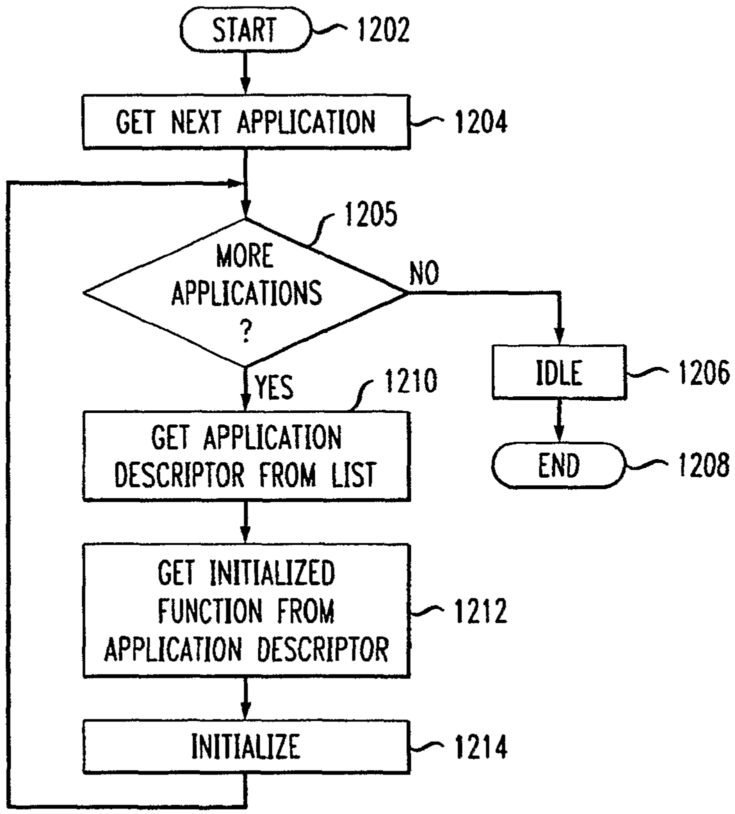
FIG. 10 is a flowchart detailing the steps to boot or startup the device.

Referring now to FIG. 10, a flowchart is shown detailing the steps to boot or startup the device. This process initializes all of the applications 307, but does not launch them. The process starts at step 1202. In step 1204, an application is chosen from a list of registered applications. In step 1205, it is determined if there are any remaining applications on the list that have not been initialized. If there are more applications on the list that have not been initialized, then in step 1210, the application descriptor is retrieved from the list of registered applications.

Then, in step 1212, the initialization function is retrieved from the application descriptor for the application. Then, in step 1214, the application is initialized by running the initialization function. Then the process goes back to step 1205. If, in step 1205, it is determined that there are no more applications remaining on the list that have not been initialized, then the process moves to step 1206 where the idle screen application is launched. The process ends at step 1208.

Figure 11:
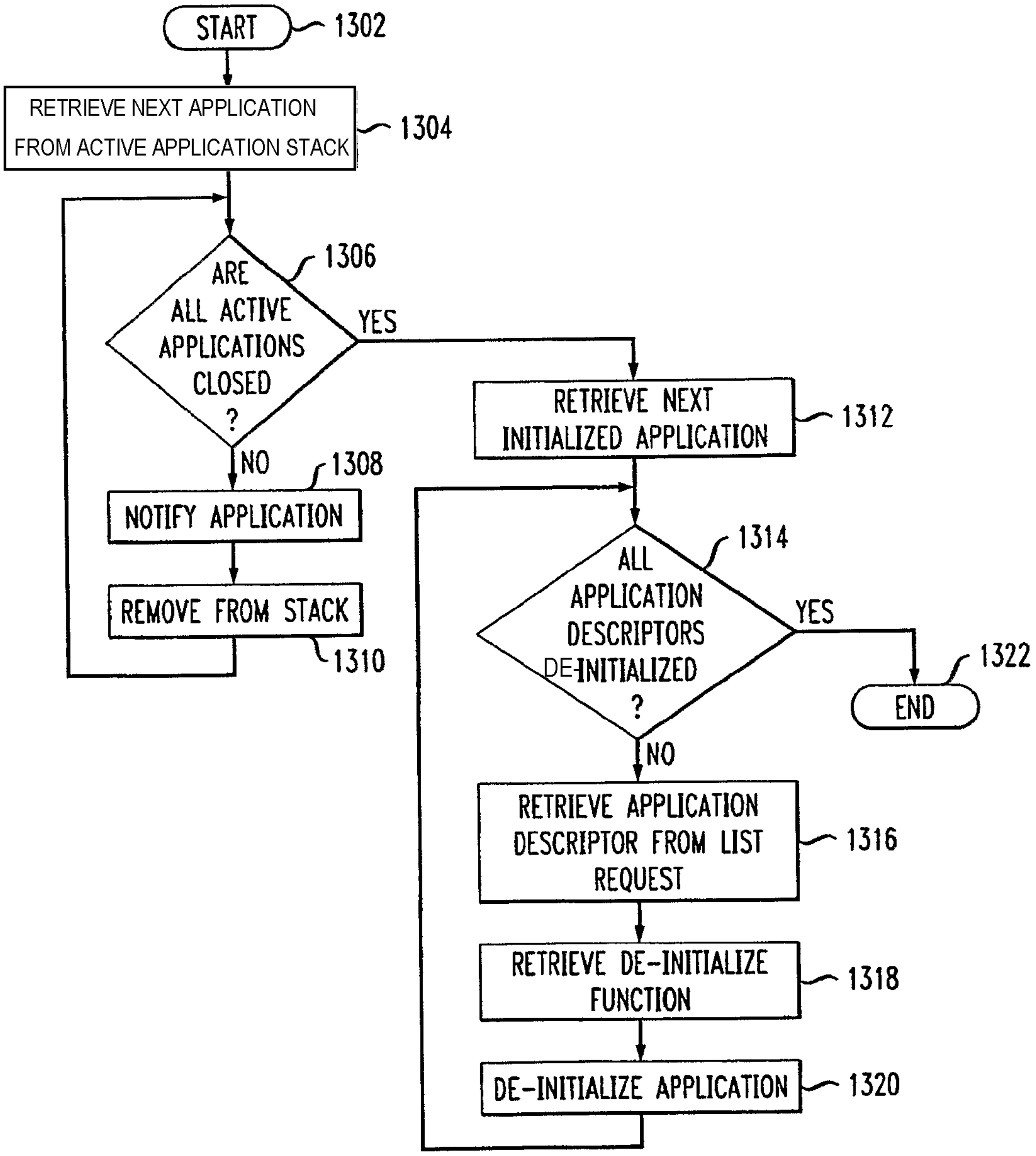
FIG. 11 is a flowchart detailing the steps to turn off the device.

Referring now to FIG. 11, a flowchart is shown detailing the steps to turn off the device. The process closes all active applications and then de-initializes them prior to powering off the device. The process starts at step 1302. In step 1304, the next application is retrieved from the active application stack. In step 1306, it is determined whether all of the active applications are closed. If it is determined that all active applications are closed, then in step 1308, the application is notified that is no longer an active application. Then in step 1310, the application is removed from the active application stack and the process returns to step 1306.

If it is determined that all active applications are closed in step 1306, the process moves to step 1312, where the next application is retrieved from the list of initialized applications. In step 1314, it is determined whether all the applications have been de-initialized. If all of the applications have not been de-initialized, then the process moves to step 1316 where the application descriptor is retrieved from the list of initialized applications. Then, in step 1318, the de-initialization function is retrieved from the application descriptor. Then, in step 1320, the application is de-initialized by running the de-initialization function for the application. Then the process moves back to step 1314. If, in step 1314, it is determined that all of the applications have been de-initialized, then the process ends at step 1322.

Figure 12:
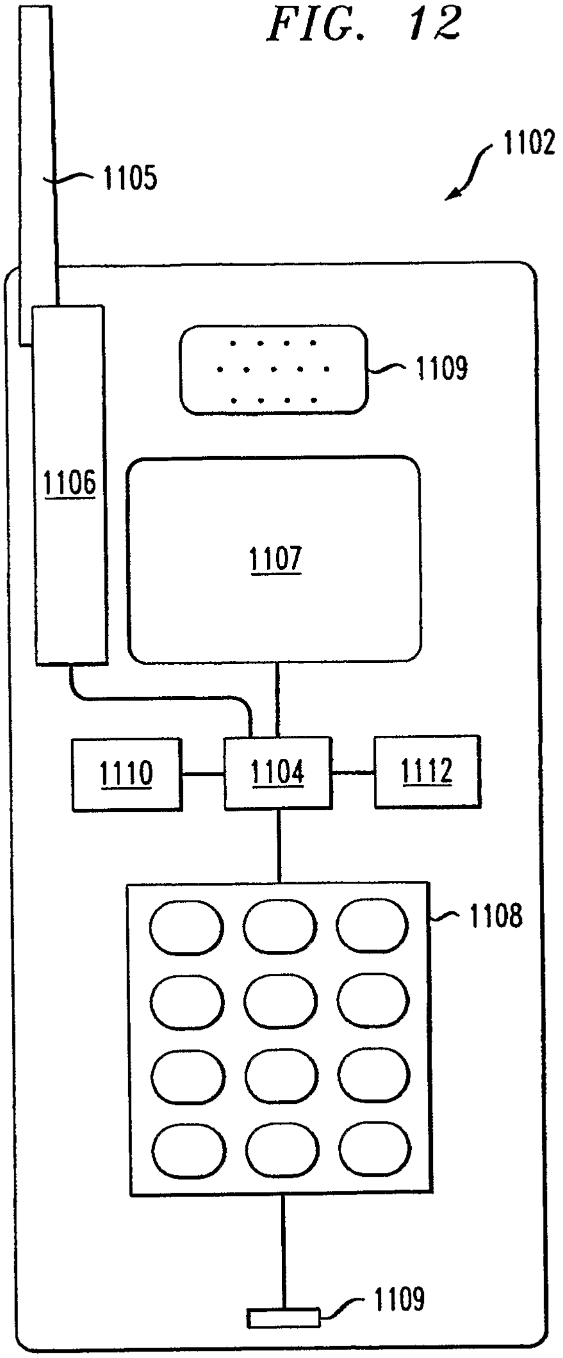
FIG. 12 is a high level block diagram of a mobile device.

The operating system and application manager described herein may be implemented using appropriately programmed device. Such devices are well known in the art, and may be implemented, for example, using well known processors, memory units, storage devices, computer software, and other components. A high level block diagram of an example of such a device or phone is shown in FIG. 12. Phone 1102 contains a processor 1104, which controls the overall operation of phone 1102 by executing program instructions, which define such operation. The program instructions may be stored in a storage device 1112 (e.g., flash RAM) and loaded into memory 1110 when execution of the program instructions is desired.

Thus, the functioning of the phone will be defined by program instructions stored in memory 1110 and/or storage 1112 and the functioning will be controlled by processor 1104 executing the program instructions. Phone 1102 also includes one or more radio transceivers 1106 and an antenna 1105 for communicating with other devices via a network. Phone 1102 also includes keypad 1108, display 1107 and speaker and microphone 1109, which represents devices which allow for user interaction with the phone 1102 (e.g., keyboard, mouse, buttons, etc.). One skilled in the art will recognize that an implementation of an actual phone will contain other components as well, and that FIG. 12 is a high level representation of some of the components of such a phone for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A computer-implemented method comprising:

launching an operating system for the computer, wherein:

the operating system is a non-multi-tasking operating system that can run only a single task at a time;

the operating system has an application layer; and the operating system further comprises:

one or more protocol stacks; and an inter-task communication mechanism for communicating between the first task and the one or more protocol stacks;

running a first task in the application layer, wherein the first task includes an application manager and the first task is not an operating system;

launching two or more applications inside the first task, wherein the two or more applications run concurrently under the control of the application manager; and maintaining, by the application manager, a stack of application descriptors, wherein:

each of the two or more applications has a corresponding application descriptor in the stack, wherein the application descriptor provides details about the corresponding application; and each application descriptor provides access to and control of a set of one or more forms associated with the corresponding application, wherein a form, different from an application descriptor, defines an image displayed on a screen.

2. The method of claim 1, further comprising switching between two of the two or more applications in response to user input.

3. The method of claim 1, wherein the set of one or more forms comprises a plurality of forms linked together to form a tree structure.

4. The method of claim 1, further comprising, prior to launching the two or more applications, initializing all the applications associated with the operating system without launching any of the applications.

5. The method of claim 1, wherein the operating system is not capable of running a second task concurrently with the first task.

6. The method of claim 1, further comprising turning off the computer by:

closing all the launched applications by notifying each launched application that it is no longer an active application;

de-initializing all the initialized applications, wherein the corresponding application descriptor of each initialized application comprises a de-initialization function, by retrieving and running the de-initialization function of each initialized application; and powering off the computer.

7. A computer-implemented method comprising:

launching an operating system for the computer, wherein:

the operating system is a non-multi-tasking operating system that can run only a single task at a time; and the operating system has an application layer;

running a first task in the application layer, wherein the first task includes an application manager and the first task is not an operating system;

launching two or more applications inside the first task, wherein the two or more applications run concurrently under the control of the application manager;

prior to launching the two or more applications, initializing all the applications associated with the operating system without launching any of the applications;

switching between two of the two or more applications in response to user input; and maintaining, by the application manager, a stack of application descriptors, wherein:

each of the two or more applications has a corresponding application descriptor in the stack, wherein the application descriptor provides details about the corresponding application;

each application descriptor provides access to and control of a set of one or more forms associated with the corresponding application, wherein a form defines an image displayed on a screen; and the set of one or more forms comprises a plurality of forms linked together to form a tree structure.

8. The method of claim 7, wherein the operating system further comprises:

one or more protocol stacks; and an inter-task communication mechanism for communicating between the first task and the one or more protocol stacks.

9. The method of claim 7, further comprising turning off the computer by:

closing all the launched applications by notifying each launched application that it is no longer an active application;

de-initializing all the initialized applications, wherein the corresponding application descriptor of each initialized application comprises a de-initialization function, by retrieving and running the de-initialization function of each initialized application; and powering off the computer.

10. A device comprising a processor and a memory, the processor adapted to:

launch an operating system for the device, wherein:

the operating system is a non-multi-tasking operating system that can run only a single task at a time;

the operating system has an application layer; and the operating system further comprises:

one or more protocol stacks; and an inter-task communication mechanism for communicating between the first task and the one or more protocol stacks;

run a first task in the application layer, wherein the first task includes an application manager and the first task is not an operating system;

launch two or more applications inside the first task, wherein the two or more applications run concurrently under the control of the application manager; and maintain, using the application manager, a stack of application descriptors, wherein:

each of the two or more applications has a corresponding application descriptor in the stack, wherein the application descriptor provides details about the corresponding application; and each application descriptor provides access to and control of a set of one or more forms associated with the corresponding application, wherein a form, different from an application descriptor, defines an image displayed on a screen.

11. The device of claim 10, wherein the processor is further adapted to switch between two of the two or more applications in response to user input.

12. The device of claim 10, wherein the set of one or more forms comprises a plurality of forms linked together to form a tree structure.

13. The device of claim 10, wherein the processor is further adapted to, prior to launching the two or more applications, initialize all the applications associated with the operating system without launching any of the applications.

14. The device of claim 10, wherein the operating system is not capable of running a second task concurrently with the first task.

15. The device of claim 10, wherein the process is further adapted to turn off the device by:

closing all the launched applications by notifying each launched application that it is no longer an active application;

de-initializing all the initialized applications, wherein the corresponding application descriptor of each initialized application comprises a de-initialization function, by retrieving and running the de-initialization function of each initialized application; and powering off the device.

16. A device comprising a processor and a memory, the processor adapted to:

launch an operating system for the device, wherein:

the operating system is a non-multi-tasking operating system that can run only a single task at a time; and the operating system has an application layer;

run a first task in the application layer, wherein the first task includes an application manager and the first task is not an operating system;

launch two or more applications inside the first task, wherein the two or more applications run concurrently under the control of the application manager;

prior to launching the two or more applications, initialize all the applications associated with the operating system without launching any of the applications;

switch between two of the two or more applications in response to user input; and maintain, using the application manager, a stack of application descriptors, wherein:

each of the two or more applications has a corresponding application descriptor in the stack, wherein the application descriptor provides details about the corresponding application; each application descriptor provides access to and control of a set of one or more forms associated with the corresponding application, wherein a form defines an image displayed on a screen; and the set of one or more forms comprises a plurality of forms linked together to form a tree structure.

17. The device of claim 16, wherein the operating system further comprises:

one or more protocol stacks; and an inter-task communication mechanism for communicating between the first task and the one or more protocol stacks.

18. The device of claim 16, wherein the process is further adapted to turn off the device by:

closing all the launched applications by notifying each launched application that it is no longer an active application;

de-initializing all the initialized applications, wherein the corresponding application descriptor of each initialized application comprises a de-initialization function, by retrieving and running the de-initialization function of each initialized application; and powering off the device.

* * * * *